United States Patent
Young

Patent Number: 5,458,355
Date of Patent: Oct. 17, 1995

[54] RETRACTABLE DOUBLE TRAILING AXLE ATTACHMENT

[76] Inventor: Francis M. Young, 3025 Mt. Carmel Dr., Waco, Tex. 76710

[21] Appl. No.: 222,927

[22] Filed: Apr. 5, 1994

[51] Int. Cl.⁶ .................................................. B62D 61/12
[52] U.S. Cl. .................................. 280/405.1; 280/415.1; 180/27.02
[58] Field of Search ................................ 280/405.1, 414.5, 280/43, 43.13, 43.17, 43.18, 43.23, 407.1, 149.2; 180/24.02, 209

[56] References Cited

U.S. PATENT DOCUMENTS

| | | | |
|---|---|---|---|
| 3,161,418 | 12/1964 | Brennan et al. | 280/405.1 |
| 3,610,653 | 10/1971 | Derrwaldt | 280/81 |
| 3,877,715 | 4/1975 | Thayer et al. | 180/24.02 |
| 4,063,779 | 12/1977 | Martin et al. | 180/24.02 |
| 4,079,798 | 3/1978 | Ferris | 180/24.02 |
| 4,165,792 | 8/1979 | Hohl et al. | 180/24.02 |
| 4,243,328 | 1/1981 | Prichard | 280/407.1 |
| 4,417,739 | 11/1983 | Whitaker | 180/24.02 |
| 4,762,421 | 8/1988 | Christenson et al. | 180/209 |
| 4,940,287 | 7/1990 | Ritchie | 180/24.02 |
| 5,018,755 | 5/1991 | McNeilus et al. | 180/24.02 |
| 5,029,895 | 7/1991 | Anderson | 280/764.1 |
| 5,067,740 | 11/1991 | Christenson | 280/405.1 |

Primary Examiner—Kevin T. Hurley
Attorney, Agent, or Firm—Diller, Ramik & Wight

[57] ABSTRACT

The invention relates to a retractable double trailing axle attachment that is mounted on an extended frame of a vehicle for increasing the legal load carrying capacity of the vehicle by adding more axles thereto. The retractable double trailing axle attachment includes a pair of generally parallel beams carrying wheels at opposite ends, a pair of arms pivotally connected to the beams and to a support, and pneumatic cylinders and piston rods for effecting movement of the pair of arms from a position at which the beams are generally horizontal to the ground with the wheels engaging the same, and a second nonrunning position in which the arms support the wheels in a superimposed position through the intermediary of a pneumatic air bag.

60 Claims, 4 Drawing Sheets

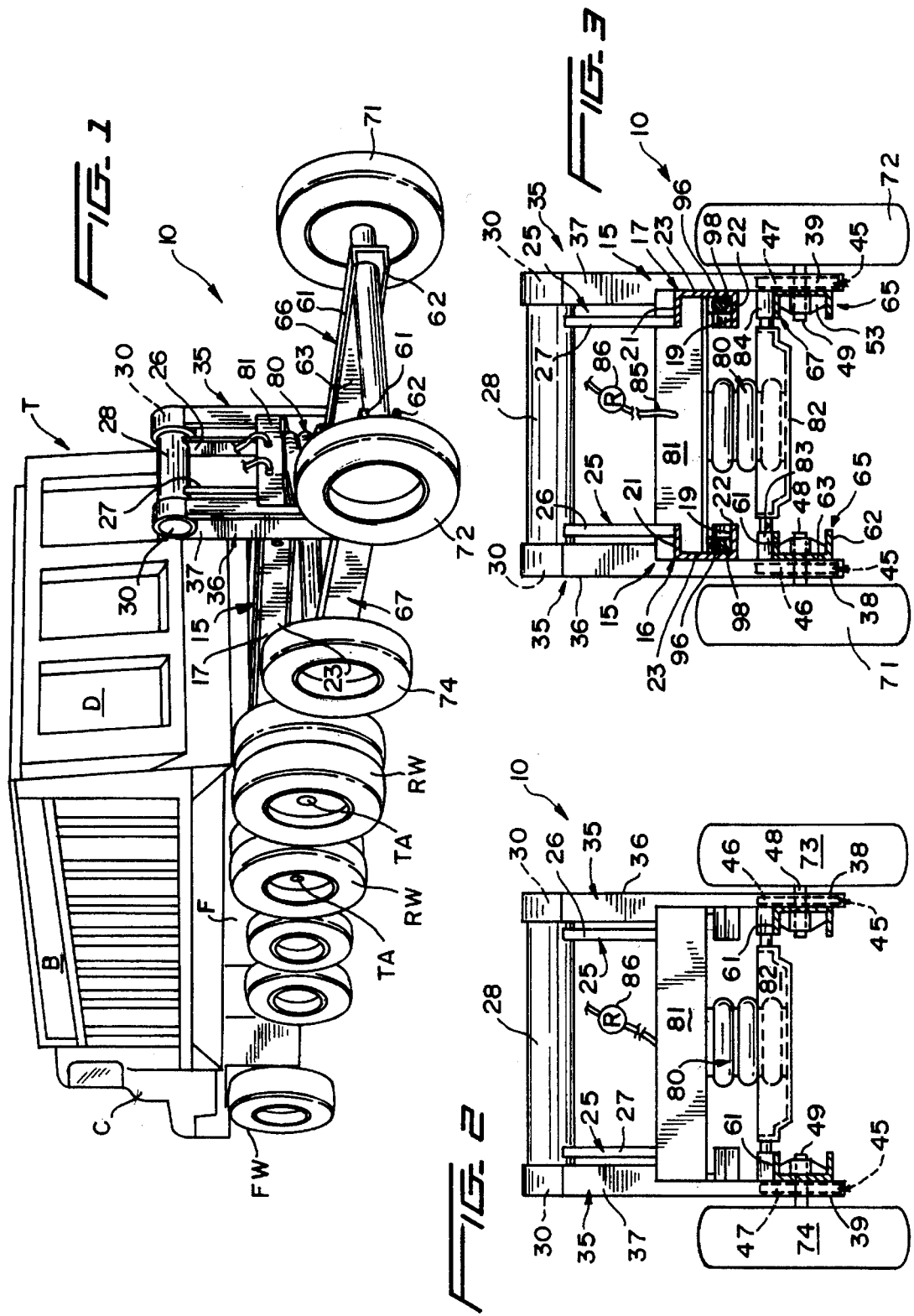

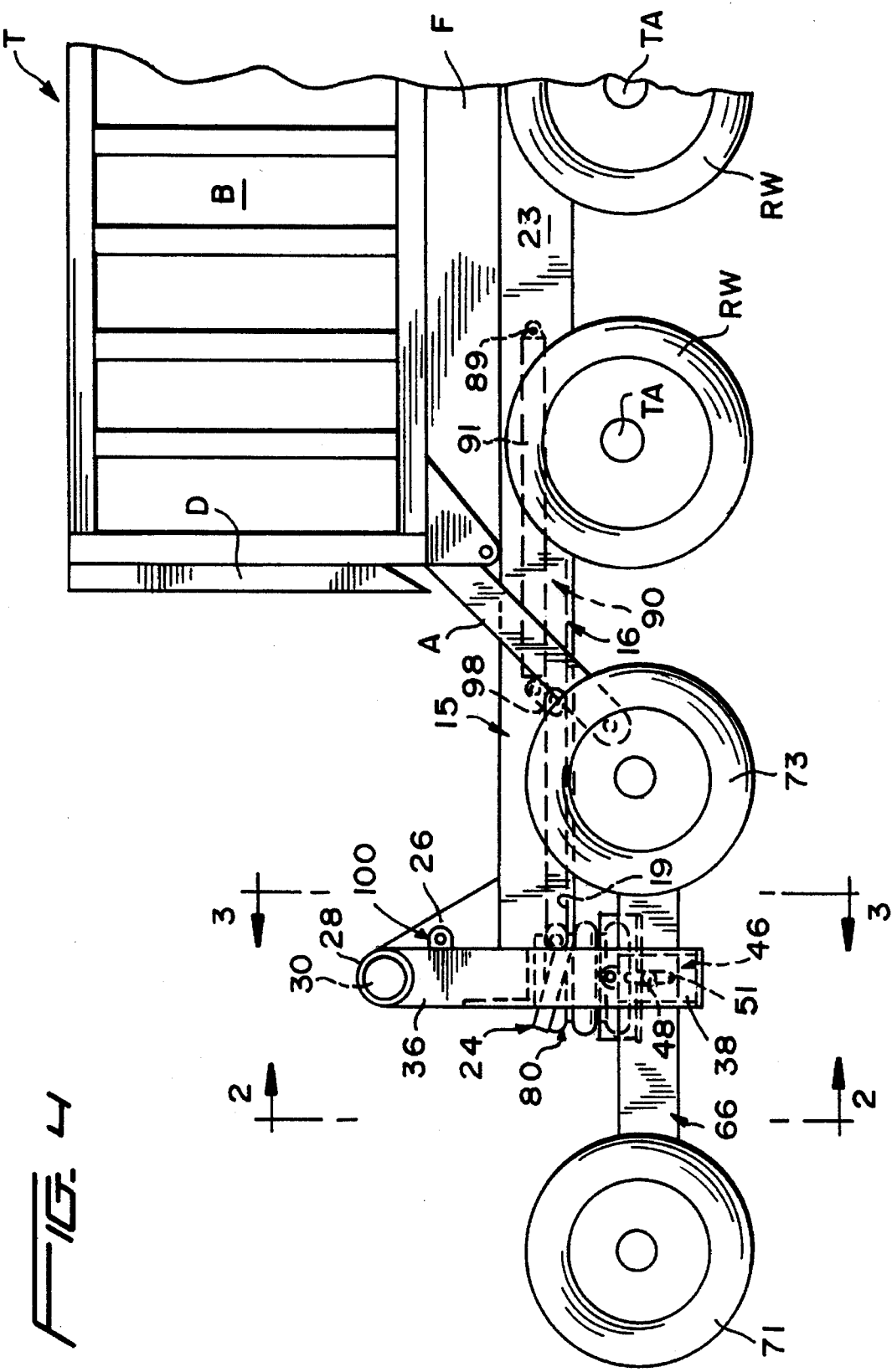

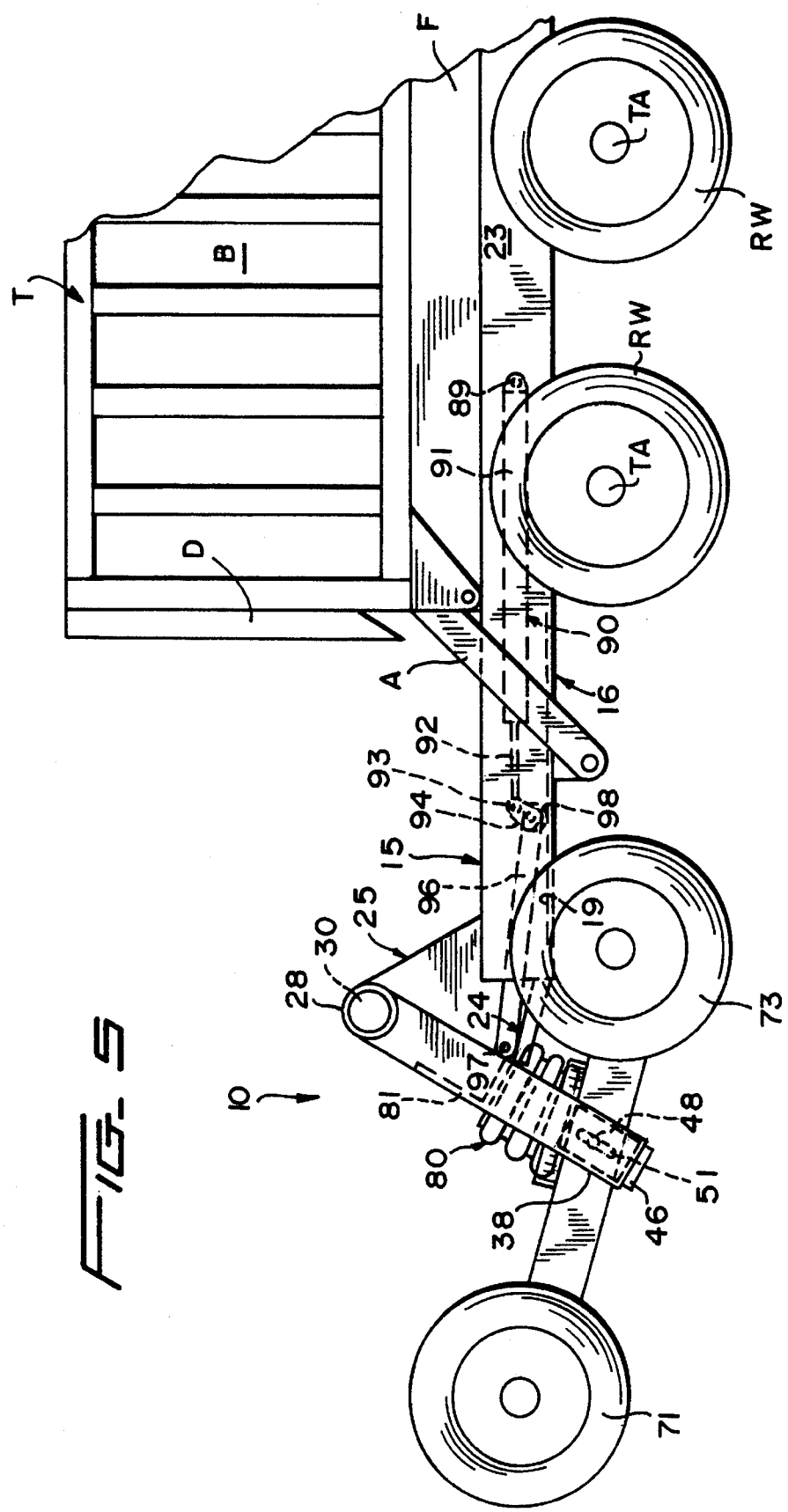

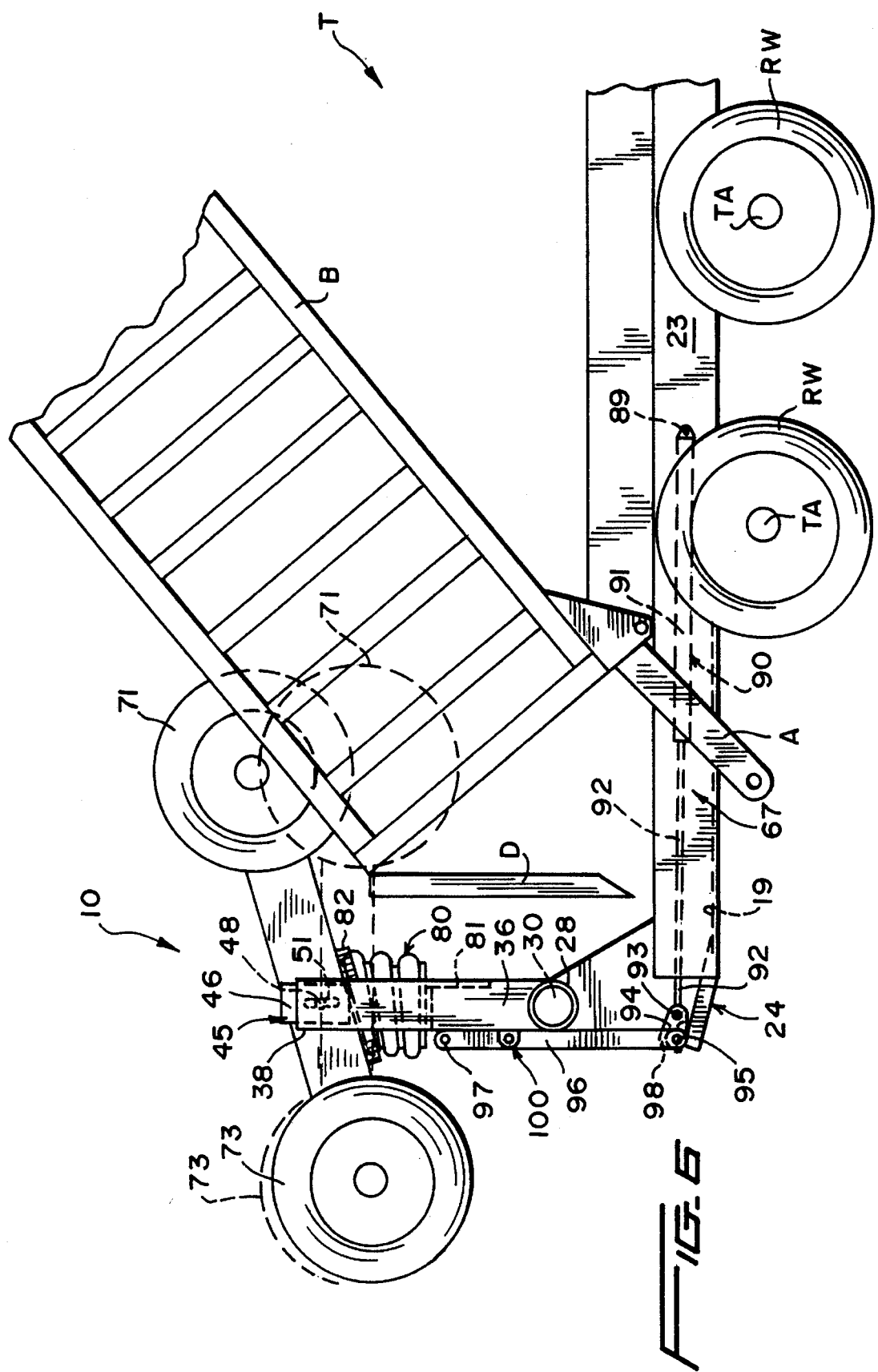

RETRACTABLE DOUBLE TRAILING AXLE ATTACHMENT

BACKGROUND OF THE INVENTION

The invention is directed to a retractable double trailing axle attachment that is adapted to be mounted on an extended frame of a tandem axle dump truck although the attachment can be utilized with a variety of different vehicles. The retractable double trailing axle attachment permits an increase in the legal load carrying capacity of the associated dump truck by adding more axles thereto while still maintaining the maneuverability during running conditions while providing the convenience of raising or retracting the axles up out of the way in a nonrunning/dumping position for dumping directly behind the dump truck. The latter is essential in order to dump such materials as hot mixed asphalt into a paving machine. Thus, with the present retractable double trailing axle attachment a total of two more axles are provided immediately at the rear of the dump truck adjacent the tandem axles thereof resulting in a total of seven axles within thirty four feet. In Texas, and possibly other states, this allows a tandem axle dump truck to haul 80,000 lbs., the maximum allowable load on any Texas highway. Accordingly, a higher legal pay load and attendant convenience is achieved by the retractable double trailing axle attachment of the present invention.

DESCRIPTION OF RELATED ART

U.S. Pat. No. 4,940,287 discloses an apparatus which enhances the load carrying capacity of a dump truck which utilizes a rigid frame added to the back end of a truck which includes a beam carrying an axle and a pair of wheels. A hydraulic cylinder pivots the beam between a load bearing position in which the wheels travel on the roadway to support part of the dump bed load and a raised non running position in which the beam extends generally vertically with the wheels raised.

U.S. Pat. No. 4,063,779 discloses a load transfer device for transferring a portion of the load normally carried by the rear wheel sets of a dump truck to the front wheel sets thereof. The load transfer device is in the form of a tag frame which is pivotally mounted on the tail gate of a dump truck and is movable between an elevated position in which the tag frame is disposed generally vertically and closely adjacent the tail gate and a lower position in which the wheel set of the tag frame is in a ground engaging position. A pair of hydraulic cylinders and associated piston rods pivot the tag frame between the two positions.

U.S. Pat. No. 3,877,715 discloses a fluid suspension system for the rear auxiliary axle and wheels of a truck. A fluid cylinder and piston rod loads the auxiliary wheels under all normal conditions to support a part of the rear load and also transfers a part of the load from the rear wheels of the vehicle to the front wheels thereof.

U.S. Pat. No. 4,079,798 discloses a pivotally mounted frame for supporting extra load-carrying wheels in order to reduce load concentrations transmitted to highways to within allowable limits as set by statute and/or regulatory agencies in various states. The load-carrying unit is pivoted by a fluid cylinder between a position at which the wheels thereof are in rolling engagement with the highway and a second position retracted to a generally upright and forwardly directed position. These units are preferably mounted one on each side of the load-carrying vehicle.

Other representative examples of auxiliary supports for heavily laden trucks can be found in U.S. Pat. Nos. 3,610,653; 4,417,739; 3,161,418; 5,029,895 and 3,191,961.

SUMMARY OF THE INVENTION

A novel retractable double trailing axle attachment of the present invention includes a frame for attachment to a wheeled vehicle. An upright support structure is carried by the frame and pivotally connected thereto are a pair of arms which are in turn connected by a slidably/pivotally connecting mechanism to a pair of walking beams which carry wheel assemblies at opposite ends thereof. Pneumatic biasing means in the form of a bellows air bag is housed between the arms and the beams and normally bias these components away from each other which under load running conditions provide pneumatic suspension of the double trailing axle attachment as it moves along a roadway. The arms are moved between a first running position at which the wheels of the beam contact the ground/roadway and a second nonrunning position at which the wheels are elevated well above the ground and preferably with the normally rearmost wheels in the running position being forwardmost in the nonrunning position.

The wheel assemblies are also conventionally secured by steering axles to the beams to permit a high degree of vehicle maneuverability, and the pivotal/slidable connecting means between each arm and its associated beam permits independent flexure of the wheels and axles independently of each other to accommodate for irregular ground/roadway during running conditions.

The pneumatic biasing means or bellows air bag is preferably relatively highly pressurized during loaded rolling engagement of the wheels with the roadway, and depending upon the load of the associated vehicle (dump truck, for example), the air pressure in the bellows air bag can be increased or decreased to accommodate for road conditions. The air pressure is also adjusted in the retracted position of the arms to locate the beams at a position most efficient for vehicle dumping.

Preferably fluidically operated cylinders and piston rods are utilized to pivot the arms and, thus, the beam carrying the double axles and associated wheels in the running and nonrunning positions thereof. Preferably, cam and cam followers are utilized to augment the pivoting movement of the arms from the running position to the nonrunning position thereof. Also, a positive pressure locking pin mechanism is operative to lock the arms in the running and the nonrunning positions thereof.

Preferably the arms are polygonal tubular housings which are at lower ends thereof in external sliding relationship to block-like polygonal sliding members. A pivot pin is fixed to each block-like sliding member and to an associated beam and passes through a blind ended slot of an innermost wall of each of the hollow arms. Each pivot can, therefore, bottom in its associated slot in both the running and nonrunning positions thereof.

In further accordance with the present invention, cam and cam follower means are utilized between the piston rods and the arms to augment the pivoting movement of the arms from the running to the nonrunning positions thereof.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a rear perspective view of a tandem axle dump truck, and illustrates a novel retractable double trailing axle attachment secured thereto including an extended frame connected to the dump truck and carrying an upright support to which is pivotally secured a pair of generally parallel arms which in turn carry a pair of horizontal walking beams supporting axles and associated wheels.

FIG. 2 is a cross-sectional view taken generally along line 2—2 of FIG. 4, and illustrates pneumatic biasing means in the form of an air bag supported between a support member bridging the pair of arms and a support member pivotally secured to the walking beams.

FIG. 3 is a cross-sectional view taken generally along line 3—3 of FIG. 4, and illustrates cam followers moving along cams for augmenting the pivoting movement of the pair of arms from a first running position thereof (FIGS. 1 and 4) toward a second nonrunning position thereof (FIG. 6).

FIG. 4 is a fragmentary side elevational view of the retractable double trailing axle attachment of the present invention, and illustrates the first running position thereof at which the wheels are in running relationship to the ground.

FIG. 5 is a fragmentary slide elevational view of the retractable double trailing axle attachment of the present axle attachment of the present invention, and illustrates an intermediate position thereof as the walking beams and associated wheel assemblies begin moving toward the position shown in FIG. 3 as the associated arms pivot in a clockwise direction.

FIG. 6 is a fragmentary side elevational view illustrating the retractable double trailing axle attachment in its fully retracted position with a dump box of the dump vehicle in its dumping position.

DESCRIPTION OF THE PREFERRED EMBODIMENT

A novel retractable double trailing axle attachment of the present invention is generally designated by the reference numeral 10 and is best illustrated in FIGS. 1 and 4 through 6 of the drawings connected to a tandem axle dump vehicle or truck T.

The tandem axle dump truck T is of a conventional construction and includes a cab C (FIG. 1), a conventional dump frame F carrying a dump truck box B which in turn has pivotally connected thereto a dump door D shown closed in FIGS. 1, 4 and 5 and open in FIG. 6. An attachment A serves as a pivot for the dump frame F and the latter can be moved from the position shown in FIG. 5 to that shown in FIG. 6 by a conventional dumping cylinder and piston rod (not shown) connected between the dump truck box B and the dump frame F. The truck T includes conventional front steering wheels or wheel assemblies FW and rear tandem axles TA carrying dual rear wheels RW.

The retractable double trailing axle attachment 10 of the present invention includes frame means 15 defined by a pair of generally parallel spaced side-by-side C-beams 16, 17 which are welded, bolted, or otherwise fastened to the dump frame F. Each frame C-beam 16, 17 is defined by upper and lower parallel flanges 21, 22, respectively (FIG. 3), and a generally vertical bight wall 23 therebetween. The lower flanges 22 each have an upper surface 19 which merges with cam means or cam surface means 24 in the form of an upper surface of a plate projecting slightly upwardly and rearwardly inclined from each of the frame C-beams 16, 17, as is best illustrated in FIGS. 4, 5, and 6 for a purpose to be described more fully hereinafter.

Upright support means 25 are defined by a pair of vertically upright support members 26, 27 having lower ends (unnumbered) welded to the upper flanges 21, 21 of the respective frame C-beams 16, 17, as is best illustrated in FIG. 3. Upper ends (unnumbered) of the vertically upright support members 26, 27 have welded thereto a tubular bridging member 28 which at its axially opposite ends (unnumbered) defines pivot means 30 which rotatably journal first or upper ends (unnumbered) of arm means 35 defined by a pair of generally parallel arms 36, 37 which are also parallel arms 36, 37 which are also parallel to the vertically upright supporting members 26, 27, as is best illustrated in FIGS. 1 through 3 of the drawings.

The arms 36, 37 are generally of a hollow polygonal box-like configuration throughout their length, including second or lower end portions thereof which are identified at 38, 39, respectively in FIG. 3. Slidable connecting means 45 in the form of hollow block-like members 46, 47 are slidably received within the respective ends 38, 39 of the respective arms 36, 37. Pivots or journals 48, 49 are welded to the innermost surfaces (unnumbered) of the block-like sliding members 46, 47, respectively, and project toward each other and through blind-ended elongated slots 51 formed in the innermost walls (unnumbered) of the arms 36, 37. The ends of the pivot pins or journals 48, 49 are rotatably journalled in journals 52, 53 secured to respective webs 63 of walking beam means 65 defined by a pair of generally parallel interconnected opposing C-beams 66, 67 each defined by the web or bight 63, an upper flange 61 and a lower flange 62. Thus, the walking beams 66, 67 can rotate relative to the respective pivot pins or journals 48, 49, and the journals 48, 49 can move the length of the elongated slots 51 of the arms 36, 37 bottoming at the blind ends (unnumbered) thereof as the operation of the retractable double trailing axle attachment 10 dictates in a manner to be described more fully hereinafter.

The walking beams 66, 67 each carry rearwardmost 71, 72 and forwardmost 73, 74 steerable wheel assemblies and/or wheels which are suitably conventionally journaled for rotation relative to the walking beams 66, 67. Obviously, the wheel assemblies/wheels 71–74 offer support for any load within the dump body B of the truck T when the retractable double trailing axle attachment 10 is in its first or running position with the wheels 71–74 contacting the ground or roadway, as is shown in FIGS. 1 through 4 of the drawings.

Pneumatic biasing means 80 in the form of a bellows air bag is housed between upper and lower generally parallel spaced transverse supporting members 81, 82. The transverse supporting member 81 spans and is welded to the arms 36, 37 whereas the transverse supporting member 82 spans and is articulately/pivotally mounted by pivotally mounted means 83, 84 to the upper webs 61 of the walking beams 66, 67 (FIG. 3). An air line 85 is in fluid communication with the interior of the air bag 80 and is connected to a conventional regulator 86 which is mounted in a convenient location and is in turn connected by a high pressure line (not shown) to a high pressure reservoir of the truck T. The high pressure reservoir can, for example, be the high pressure air tank for the air brakes of the truck T. Preferably the regulator 86 can be manually or automatically adjusted to variably regulate the air pressure within the air bag 80 which, for example, under heavy load conditions of the truck T and in the running mode of the retractable double trailing axle attachment 10 can be in the vicinity of 90 psi–100 psi. With the air bag 80 under such high internal pressure, the biasing force created thereby is in a direction tending to move the transverse supporting members 81, 82 away from each other which, obviously, is the same as a force directed downwardly against the walking beam 66, 67 which effects a pneumatic suspension or shock-absorbing feature of the attachment 10. For example, if the wheels/wheel assemblies 71, 72 hit a "bump" or a "rise" in the roadway, they would tend to lift the rearwardmost ends of the beams 66, 67 upwardly which would in turn tend to compress the air within the air bag 80 which in turn inherently increases the pressure and resists and, thus, dampens any such impact load. Obviously, for greater loads within the dump box B, the higher might be the pressure within the air bag 80 and vice versa. Suitable means (not shown) associated with the line 85 and/or the regulator 86 can be utilized to bleed air from the air bag 80 to reduce the psi therein.

Means 90 are provided for imparting a force to pivot the arms 36, 37 and the walking beams 66, 67 from the running position shown in FIG. 1 to and through the intermediate position shown in FIG. 5 to the final dumping position shown in FIG. 6. The means 90 are a duplicate pair of pneumatic cylinders 91 and piston rods 92 associated with each of the frame C-beams 16, 17. The means 90 are located generally within each of the C-beams 16, 17 with each cylinder 91 being pivotally connected by a pivot pin 89 to the respective bight wall or web 23 of the frame C-beam 16, 17. Each rod 92 is pivotally connected by a pivot pin 93 to a generally triangular link 94 which is in turn connected by a pivot pin 95 to a link 96 which is connected by a pivot pin 97 to its associated arm 36, 37. Cam means in the form of a cam follower roller 98 is carried by each pivot pin 95 and rides along the surface 19 of the flanges 22 when the piston rods 92 are extended and retracted from the respective cylinders 91. As the piston rods 92 are moved from the retracted position (FIG. 4) to a more extended position (FIG. 5), the links 94, 96 begin pivoting the arms 36, 37 about the pivots 30. As the arms 36, 37 begin to rotate clockwise, as viewed in FIGS. 4 and 5 about the pivot 30, the load of the vehicle B is progressively removed from the attachment 10 as it begins to retract, first by the progressive lifting of the rearwardmost wheels 71, 72 from the ground or roadway. As this occurs, the air pressure within the bellows air bag 80 forces the walking beams 66, 67 to both pivot clockwise relative to the arms 36, 37 which also causes the sliding blocks 46, 47 to progressively project outwardly through the bottoms of the arm ends 38, 39, as shown in FIG. 5. As the arms 36, 37 continue to pivot under the extension of the piston rods 92, the cam followers 98 progressively move along the surfaces 19 of the flanges 22 effecting linear right-to-left motion to the links 96, as is best viewed in FIG. 5, and the progressive clockwise pivoting of the arms 36, 37 until such time as the forwardmost wheel assemblies/wheels 73, 74 of the attachment 10 leave the ground or roadway at which point the pivots 48, 49 essentially bottom in the ends of the elongated slots 51 most adjacent the terminal ends (unnumbered) of the arm ends 38, 39. At this stage, the sliding block members 46, 47 are effectively telescoped outwardly of the arm ends 38, 39 their maximum distance, and this distance is maintained through the pivoting of the arms 36, 37 to their vertically upwardly projecting position (FIG. 6) at which point the walking beams 66, 67 are in the second nonrunning position or dumping position thereof (FIG. 6). Just as the walking beams 36, 36 reach the latter position, the cam follower means or cam rollers 98 reach and ride upon the inclined cam means 24 which imparts a more forceful pivoting action through the links 96 to bring the arms 36, 37 vertically. In the latter position the dump body B can be pivoted in the manner shown in FIG. 6 resulting in the automatic opening of the door D and the dumping of the load in a conventional fashion. It should be particularly noted in FIG. 6 that since the high pressure in the bellows air bag 80 remains essentially unchanged, the walking beams 36, 37 and the wheel assembly/wheels thereof occupy the solid outline position shown in FIG. 6. However, since the particular load can vary and since the retractable double trailing axle attachment 10 can be attached to vehicles of different dumping characteristics, it is desirable to adjust the position of the walking beams 36, 37 and the associated wheels/wheel assembly 71–74 in the dumping position to accommodate desired vehicles, dumping characteristics, environments, etc. Accordingly, it might be desired to allow the walking beams 36, 37 to occupy a position which they rest upon the dump truck body B or the rearmost wheel assemblies 71, 72 might be desirably positioned in the same manner. In order to do this, the regulator 86 (FIG. 3) is appropriately controlled to vent air from the bellows air bag 80 reducing the pressure therein. Since the pivots 48, 49 between the arms 36, 37 and the respective walking beams 66, 67 are located quite a distance further from the axles (not shown) of the wheel assemblies 71, 72 than from the axles 73, 74, there is more mass/weight to the right of the pivots 48, 49, as viewed in FIG. 6, then to the left of these same pivots as viewed in the same figure. Therefore, as the air pressure in the bellows air bag 83 is reduced, the mass/weight will pivot the walking beams 36, 37 clockwise generally from the solid position to the phantom outline position shown in FIG. 6. The phantom outline position also reflects the travel position of the retractable double trailing axle attachment 10 when the dump body B is in its lowered position (FIGS. 4 and 5) and when it is unnecessary to support the load. Stated otherwise, the phantom outline position in FIG. 6 is the unloaded nonrunning position of the attachment 10 when essentially the dump box B is unloaded or has such an insignificant load that it need not be augmented by the operative/running position of the attachment 10 shown in FIG. 4.

Means 100 are also provided in the form of a pneumatically actuated locking key or pin for locking the arms 36, 37 in both their vertically downward directed first running position and in their upwardly directed second nonrunning position and/or nonrunning unloaded position. The locking pin means 100 are preferably operated from the same air pressure source as that utilized for the cylinders 90, but through separate lines and/or regulators than the line 85 and the regulator 86 to assure that the locking in will hold the arms 36, 37 in either of the two desired positions should their be a failure of the air pressure in the cylinders 90. Essentially each of the arms 36, 37 carries a bracket which in turn carries one of the locking pins 100. In the running position (FIG. 4), the pin 100 of the arms 36, 37 is projected into an opening/hole of the vertical supports 26, 27, respectively. In the nonrunning or dump position, each pin is projected into an opening in the links 96. Thus, when each pin 100 is pneumatically projected into its associated opening, the arms 36, 37 cannot move either from the vertically upwardly projecting positions (FIG. 6) or the vertically downwardly projecting positions (FIG. 4).

Although a preferred embodiment of the invention has been specifically illustrated and described herein, it is to be understood that minor variations may be made in the apparatus without departing from the spirit and scope of the invention, as defined the appended claims.

I claim:

1. A retractable double trailing axle attachment comprising frame means for attachment to a wheeled vehicle, beam means for rotatably journalling wheels at opposite ends thereof, arm means having opposite first and second ends, means for pivotally connecting one of said arm means first and second ends to one of said beam means and said frame means, means for slidably connecting another of said arm means first and second ends to one of said frame means and said beam means, means for pneumatically biasing said beam means in a direction away from said pivotally connecting means, and means for imparting a force to pivot said arm means about said pivotally connecting means for pivoting said arm means from a first running position and a second nonrunning position of said arm means.

2. The retractable double trailing axle attachment as defined in claim 1 including means for mounting said pneumatic biasing means for articulating movement relative to said beam means.

3. The retractable double trailing axle attachment as defined in claim 1 including means for mounting said pneumatic biasing means for pivoting movement relative to said beam means.

4. The retractable double trailing axle attachment as defined in claim 1 wherein said pivotally connecting means pivotally connects said arm means first end to said frame means.

5. The retractable double trailing axle attachment as defined in claim 1 wherein said slidably connecting means slidably connects said arm means second end to said beam means.

6. The retractable double trailing axle attachment as defined in claim 1 wherein in said first running position and in said second nonrunning position said pivotally connecting means is located between said slidably connecting means.

7. The retractable double trailing axle attachment as defined in claim 1 wherein in said second running position said slidably connecting means is located respectively below and above said pivotally connecting means.

8. The retractable double trailing axle attachment as defined in claim 1 wherein in said first running position and in said second nonrunning position said pivotally connecting means is located between said slidably connecting means, and in said first running position said slidably connecting means is located respectively below and above said pivotally connecting means.

9. The retractable double trailing axle attachment as defined in claim 1 wherein said force imparting means includes pneumatically actuated cylinder means and piston rod means which are relatively extensible and retractable.

10. The retractable double trailing axle attachment as defined in claim 1 including supporting means carried by said frame means for supporting one of pivotally connecting means and said slidably connecting means at a position above the other of said pivotally connecting means and said slidably connecting means in said first running position.

11. The retractable double trailing axle attachment as defined in claim 1 including supporting means carried by said frame means for supporting said pivotally connecting means at a position above said slidably connecting means in said first running position.

12. The retractable double trailing axle attachment as defined in claim 1 including cooperative cam means and cam follower means for augmenting the pivoting of said arm means from said first running position toward said second nonrunning position under the influence of said force imparting means.

13. The retractable double trailing axle attachment as defined in claim 1 including means for maintaining said pneumatically biasing means under relatively high pressure in said first running position.

14. The retractable double trailing axle attachment as defined in claim 1 including means for maintaining said pneumatically biasing means under pressure in said second nonrunning position.

15. The retractable double trailing axle attachment as defined in claim 1 including means for maintaining said pneumatically biasing means under pressure in said first running position and in said second nonrunning position.

16. The retractable double trailing axle attachment as defined in claim 1 wherein said beam means is relatively elongated and has opposite forwardmost and rearwardmost ends relative to an associated vehicle to which said trailing double axle attachment is adapted to be attached, and said pivotally connecting means in said first running position is located more adjacent said beam means rearwardmost end than said beam means forwardmost end.

17. The retractable double trailing axle attachment as defined in claim 1 wherein said beam means is relatively elongated and has opposite forwardmost and rearwardmost ends relative to an associated vehicle to which said trailing double axle attachment is adapted to be attached, said slidably connecting means in said first running position is located more adjacent said beam means rearwardmost end than said beam means forwardmost end, and said slidably connecting means in said second nonrunning position is located more adjacent said beam means forwardmost end than said beam means rearwardmost end.

18. The retractable double trailing axle attachment as defined in claim 1 wherein said beam means is relatively elongated and has opposite forwardmost and rearwardmost ends relative to an associated vehicle to which said trailing double axle attachment is adapted to be attached, said slidably connecting means in said first running position is located more adjacent said beam means rearwardmost end than said beam means forwardmost end, and said slidably connecting means in said second nonrunning position is located more adjacent said beam means forwardmost end than said beam means rearwardmost end and above said pivotally connecting means.

19. The retractable double trailing axle attachment as defined in claim 1 including further means for pivotally connecting said slidably connecting means to one of said beam means and said arm means.

20. The retractable double trailing axle attachment as defined in claim 1 including further means for pivotally connecting said slidably connecting means to said beam means.

21. The retractable double trailing axle attachment as defined in claim 1 including further means for pivotally connecting said slidably connecting means to said beam means, and said arm means second end is in sliding relationship to said slidably connecting means.

22. The retractable double trailing axle attachment as defined in claim 1 including further means for pivotally connecting said slidably connecting means to said beam means, said arm means second end is in sliding relationship to said slidably connecting means, and said arm means second end includes a generally polygonal housing in sliding relationship to said slidably connecting means.

23. The retractable double trailing axle attachment as defined in claim 1 including further means for pivotally connecting said slidably connecting means to said beam means, said arm means second end is in sliding relationship to said slidably connecting means, and said arm means second end includes a generally polygonal housing in external sliding relationship to said slidably connecting means.

24. The retractable double trailing axle attachment as defined in claim 1 including further means for pivotally connecting said slidably connecting means to said beam means, said arm means second end is in sliding relationship to said slidably connecting means, said arm means second end includes a generally polygonal housing in external sliding relationship to said slidably connecting means, said polygonal housing includes elongated slot means having a blind end for receipt therethrough and sliding therein said further pivotally connecting means, and said further pivotally connecting means being connected at opposite ends thereof to respective ones of said slidably connecting means.

25. The retractable double trailing axle attachment as defined in claim 8 including means for mounting said pneumatic biasing means for articulating movement relative to said beam means.

26. The retractable double trailing axle attachment as defined in claim 8 wherein said force imparting means includes pneumatically actuated cylinder means and piston rod means which are relatively extensible and retractable.

27. The retractable double trailing axle attachment as defined in claim 8 including supporting means carried by said frame means for supporting said pivotally connecting means at a position above said slidably connecting means in said first running position.

28. The retractable double trailing axle attachment as defined in claim 8 including cooperative cam means and cam follower means for augmenting the pivoting of said arm means from said first running position toward said second nonrunning position under the influence of said force imparting means.

29. The retractable double trailing axle attachment as defined in claim 8 including further means for pivotally connecting said slidably connecting means to one of said beam means and said arm means.

30. The retractable double trailing axle attachment as defined in claim 29 including means for mounting said pneumatic biasing means for articulating movement relative to said beam means.

31. The retractable double trailing axle attachment as defined in claim 29 wherein said force imparting means includes pneumatically actuated cylinder means and piston rod means which are relatively extensible and retractable.

32. The retractable double trailing axle attachment as defined in claim 29 including supporting means carried by said frame means for supporting said pivotally connecting means at a position above said slidably connecting means in said first running position.

33. The retractable double trailing axle attachment as defined in claim 29 including cooperative cam means and cam follower means for augmenting the pivoting of said arm means from said first running position toward said second nonrunning position under the influence of said force imparting means.

34. The retractable double trailing axle attachment as defined in claim 8 including further means for pivotally connecting said slidably connecting means to said beam means.

35. The retractable double trailing axle attachment as defined in claim 8 including further means for pivotally connecting said slidably connecting means to said beam means, and said arm means second end is in sliding relationship to said slidably connecting means.

36. The retractable double trailing axle attachment as defined in claim 8 including further means for pivotally connecting said slidably connecting means to said beam means, said arm means second end is in sliding relationship to said slidably connecting means, and said arm means second end includes a generally polygonal housing in sliding relationship to said slidably connecting means.

37. The retractable double trailing axle attachment as defined in claim 8 including further means for pivotally connecting said slidably connecting means to said beam means, said arm means second end is in sliding relationship to said slidably connecting means, and said arm means second end includes a generally polygonal housing in external sliding relationship to said slidably connecting means.

38. The retractable double trailing axle attachment as defined in claim 35 including supporting means carried by said frame means for supporting said pivotally connecting means at a position above said slidably connecting means in said first running position.

39. The retractable double trailing axle attachment as defined in claim 35 including cooperative cam means and cam follower means for augmenting the pivoting of said arm means from said first running position toward said second nonrunning position under the influence of said force imparting means.

40. A trailing double axle attachment comprising a frame adapted for attachment to a wheeled vehicle, a pair of interconnected generally parallel beams having first and second ends adapted to be disposed respectively adjacent to and remote from an associated wheeled vehicle, means for journalling wheels at said beams first and second ends, a support structure carried by said frame, a pair of interconnected generally parallel arms each having first and second ends, first means for pivotally connecting said arm first ends to said support structure, means for slidably connecting said arms second ends to said beams, second means for pivotally connecting said slidably connecting means to said arms, means for creating a biasing force in a direction for moving said slidably connecting means and said arms away from each other, and means for imparting a force to pivot said arms about said first pivotally connecting means for pivoting said arms from a first running position and a second nonrunning position of said arms.

41. The trailing double axle attachment as defined in claim 40 wherein said biasing force creating means is pneumatic.

42. The trailing double axle attachment as defined in claim 40 including means for mounting said biasing force creating means for articulating movement relative to said beams.

43. The trailing double axle attachment as defined in claim 40 including a pair of relatively spaced support members housing said biasing force creating means therebetween, a first of said support members being in spanning relationship to said arms, and a second of said support members being in spanning relationship to said beams.

44. The trailing double axle attachment as defined in claim 40 including a pair of relatively spaced support members housing said biasing force creating means therebetween, a first of said support members being in spanning relationship to said arms, a second of said support members being in spanning relationship to said beams, and means articulately connecting said second support member to said beams.

45. The trailing double axle attachment as defined in claim 40 including a pair of relatively spaced support members housing said biasing force creating means therebetween, a first of said support members being in spanning relationship to said arms, a second of said support members being in spanning relationship to said beams, and means pivotally connecting said second support member to said beams.

46. The trailing double axle attachment as defined in claim 40 wherein said arms second ends each having a blind ended slot, and said second pivotally connecting means includes a pivot pin passing through each blind ended slot in spanning relationship between an adjacent beam and slidable connecting means.

47. The trailing double axle attachment as defined in claim 40 wherein said arms second ends each having a blind ended slot, and said second pivotally connecting means includes a pivot pin passing through each blind ended slot in spanning relationship between an adjacent beam and slidable connecting means, said arms second ends each include a hollow housing, each hollow housing includes a wall adjacent an associated beam, each said wall includes one of said blind ended slots, and said slidably connecting means is a sliding member slidably received within each arm hollow housing.

48. The trailing double axle attachment as defined in claim 40 wherein said force imparting means includes cylinder means and piston rod means which are relatively extensible and retractable.

49. The trailing double axle attachment as defined in claim 40 including cooperative cam means and cam follower means for augmenting the pivoting of said arms from said first running position toward said second nonrunning position under the influence of said force imparting means.

50. The trailing double axle attachment as defined in claim 40 including cooperative cam means and cam follower means for augmenting the pivoting of said arms from said first running position toward said second nonrunning position under the influence of said force imparting means, and said force imparting means includes cylinder means and piston rod means which are relatively extensible and retractable.

51. The trailing double axle attachment as defined in claim 40 wherein said force imparting means includes cylinder means and piston rod means which are relatively extensible and retractable, said cylinder means and piston rod means include a pair of cylinders and piston rods positioned as a side-by-side pair along said frame, a pair of pivotally connected links associated with each piston rod, a first of each link being connected to an associated rod, a second of each link being connected to an associated arm, cam follower means associated with said pair of links, and cam means of said frame along which said cam follower means move upon extension of said piston rods from said cylinders to augment the pivoting of said arms from said first running position to said second nonrunning position.

52. The trailing double axle attachment as defined in claim 40 wherein said support structure is generally upright and thereby positions said first pivotally connecting means above said frame at a point more adjacent said beams first ends than said beams second ends, said beams and said slidably connecting means being positioned beneath said first pivotally connecting means in said first running position, and said slidably connecting means being positioned above said first pivotally connecting means in said second nonrunning position.

53. The trailing double axle attachment as defined in claim 40 wherein said biasing force creating means is pneumatic, and means for maintaining said pneumatic biasing force creating means under relatively high pressure in said first running position.

54. The trailing double axle attachment as defined in claim 40 wherein said biasing force creating means is pneumatic, and means for maintaining said pneumatic biasing force creating means under relatively high pressure in said second running position.

55. The trailing double axle attachment as defined in claim 40 wherein said biasing force creating means is pneumatic, and means for maintaining said pneumatic biasing force creating means under pressure in said first running position and said second nonrunning position.

56. The trailing double axle attachment as defined in claim 43 wherein said arms second ends each having a blind ended slot, and said second pivotally connecting means includes a pivot pin passing through each blind ended slot in spanning relationship between an adjacent beam and slidable connecting means.

57. The trailing double axle attachment as defined in claim 43 wherein said arms second ends each having a blind ended slot, and said second pivotally connecting means includes a pivot pin passing through each blind ended slot in spanning relationship between an adjacent beam and slidable connecting means, said arms second ends each include a hollow housing, each hollow housing includes a wall adjacent an associated beam, each said wall includes one of said blind ended slots, and said slidably connecting means is a sliding member slidably received within each arm hollow housing.

58. The trailing double axle attachment as defined in claim 49 including a pair of relatively spaced support members housing said biasing force creating means therebetween, a first of said support members being in spanning relationship to said arms, and a second of said support members being in spanning relationship to said beams.

59. The trailing double axle attachment as defined in claim 49 wherein said support structure is generally upright and thereby positions said first pivotally connecting means above said frame at a point more adjacent said beams first ends than said beams second ends, said beams and said slidably connecting means being positioned beneath said first pivotally connecting means in said first running position, and said slidably connecting means being positioned above said first pivotally connecting means in said second nonrunning position.

60. The trailing double axle attachment as defined in claim 49 wherein said biasing force creating means is pneumatic, and means for maintaining said pneumatic biasing force creating means under relatively high pressure in said first running position.

* * * * *